United States Patent
Ahuja

(10) Patent No.: US 10,554,780 B2
(45) Date of Patent: Feb. 4, 2020

(54) SYSTEM AND METHOD FOR AUTOMATED PERSONALIZATION OF AN ENVIRONMENT

(71) Applicant: Samsung Electronics Co., Ltd, Suwon-si (KR)

(72) Inventor: Himani Ahuja, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/442,567

(22) Filed: Feb. 24, 2017

(65) Prior Publication Data

US 2018/0248972 A1 Aug. 30, 2018

(51) Int. Cl.
*H04L 29/08* (2006.01)
*H04W 4/02* (2018.01)
(Continued)

(52) U.S. Cl.
CPC .......... *H04L 67/306* (2013.01); *G06F 9/4451* (2013.01); *G08C 17/02* (2013.01);
(Continued)

(58) Field of Classification Search
CPC ......... H04W 4/02; H04W 4/08; H04W 4/023; H04W 4/80; H04W 12/06; H04W 4/021; H04W 12/00508; H04W 12/08; H04W 36/005; H04W 36/32; H04W 36/34; H04W 48/02; H04W 48/04; H04W 4/029; H04W 4/04; H04W 4/043; H04W 4/046; H04W 4/06; H04W 4/12; H04W 4/21; H04W 4/30; H04W 4/40; H04W 4/48; H04W 4/60; H04W 4/70; H04W 76/11; H04W 76/19; H04W 84/005; H04W 84/18; H04W 88/02; B60R 16/037; B60R 11/04;
(Continued)

(56) References Cited

U.S. PATENT DOCUMENTS

| 10,364,946 B1* | 7/2019 | Bertoni | G08C 17/02 |
| 2012/0190386 A1* | 7/2012 | Anderson | G01C 15/04 |
| | | | 455/456.3 |

(Continued)

FOREIGN PATENT DOCUMENTS

| KR | 10-1043518 B1 | 6/2011 |
| KR | 10-1624360 B1 | 5/2016 |
| KR | 10-2016-0080357 A | 7/2016 |

OTHER PUBLICATIONS

International Search Report dated May 29, 2018 in connection with International Patent Application No. PCT/KR2018/002292.

(Continued)

*Primary Examiner* — Dionne Pendleton

(57) ABSTRACT

An electronic device configured to control an environment includes a communication unit and a processor. The communication unit is configured to communicate with a server, at least one user device, and at least one connected device. The processor is operatively coupled to the communication unit and configured to receive identification information from the at least one user device, receive a user profile corresponding to the identification information of the at least one user device from the server, the user profile including at least one user preference, and control the at least one connected device to control the environment based on the user profile.

20 Claims, 6 Drawing Sheets

(51) Int. Cl.
*G08C 17/02* (2006.01)
*H04L 12/28* (2006.01)
*G06F 9/445* (2018.01)

(52) U.S. Cl.
CPC ........ *H04L 12/2829* (2013.01); *H04L 67/125* (2013.01); *H04W 4/023* (2013.01); *G05B 2219/2614* (2013.01); *G05B 2219/2637* (2013.01); *G05B 2219/2642* (2013.01); *G08C 2201/34* (2013.01); *G08C 2201/91* (2013.01)

(58) Field of Classification Search
CPC ..... B60R 16/0373; B60R 25/00; B60R 25/01; B60R 25/1004; B60R 25/102; B60R 25/20; B60R 25/2081; B60R 25/25; B60R 25/257; G06F 17/30528; G06F 17/3056; G06F 16/24575; G06F 16/252; G06F 16/951; G06F 21/32; G06F 3/04842; G06F 16/183; G06F 16/25; G06F 16/335; G06F 16/583; G06F 17/28; G06F 21/00; G06F 21/31; G06F 21/33; G06F 21/335; G06F 21/35; G06F 2203/04803; G06F 2221/2115; G06F 2221/2117; G06F 3/013; G06F 3/016; G06F 3/017; G06F 3/0481; G06F 3/0482; G06F 3/04845; G06F 3/0488; G06F 3/04886; G06F 3/0622; G06F 3/0637; G06F 3/0673; G06F 3/1454; G06F 3/167; G06F 8/65; G06F 9/451; G06K 9/00288; G06K 9/00302; G06K 9/00838; G06K 2009/00939; G06K 9/00221; G06K 9/00255; G06K 9/00268; G06K 9/00335; G06K 9/00355; G06K 9/00832; G06K 9/6202; G08C 17/02; G08C 2201/34; G08C 2201/91; H04L 12/282; H04L 2012/2841; H04L 67/125; H04L 67/306; H04L 12/2803; H04L 63/08; H04L 63/102; H04L 12/1813; H04L 12/1822; H04L 12/1827; H04L 12/2809; H04L 12/2827; H04L 51/002; H04L 51/046; H04L 51/32; H04L 63/0236; H04L 63/0428; H04L 63/0823; H04L 63/0861; H04L 63/105; H04L 63/20; H04L 67/10; H04L 67/12; H04L 67/26; H04L 67/34; H04L 9/3231; H04L 9/3263; G07C 9/00158; G07C 2209/62; G07C 5/00; G07C 5/006; G07C 5/008; G07C 5/02; G07C 5/0808; G07C 5/085; G07C 9/00126; G07C 9/00563; G07C 9/00571; A61B 2503/04; A61B 5/0077; A61B 5/4809; A61B 5/6808; A61B 5/7405; A61B 5/742; A61B 7/04; B60C 1/00; B60H 1/00742; B60K 2370/11; B60K 2370/146; B60K 2370/15; B60K 2370/193; B60K 2370/52; B60K 35/00; B60N 2/0244; B60Q 1/00; B60Q 1/52; B60Q 9/00; B60W 2040/0809; B60W 2040/0881; B60W 2050/146; B60W 2540/00; B60W 2540/12; B60W 2540/18; B60W 2540/30; B60W 40/08; B60W 40/09; B60W 50/08; B60W 50/085; B60W 50/10; G01C 21/00; G01C 21/206; G01C 21/26; G01C 21/28; G01C 21/34; G01C 21/3415; G01C 21/3446; G01C 21/3476; G01C 21/3484; G01C 21/36; G01C 21/3617; G01C 21/362; G01C 21/3629; G01C 21/3641; G01C 21/3647; G01C 21/365; G01C 21/3667; G01C 21/3691; G01C 21/3697; G01S 19/14; G01S 19/35; G01S 19/42; G01S 19/48; G01S 5/14; G05B 15/02; G05D 1/0016; G05D 1/0022; G05D 1/0027; G05D 1/021; G05D 1/0212; G05D 1/0276; G05D 23/1917; G06Q 10/00; G06Q 10/02; G06Q 10/1095; G06Q 10/20; G06Q 20/1085; G06Q 20/145; G06Q 20/32; G06Q 20/3821; G06Q 20/3829; G06Q 20/40145; G06Q 30/00; G06Q 30/012; G06Q 30/0265; G06Q 30/0266; G06Q 30/0633; G06Q 30/0639; G06Q 30/0641; G06Q 30/0645; G06Q 50/30; G08B 13/19647; G08B 21/0205; G08B 21/06; G08B 21/18; G08B 25/016; G08B 29/188; G08G 1/01; G08G 1/07; G08G 1/0965; G08G 1/096725; G08G 1/096741; G08G 1/096775; G08G 1/0968; G08G 1/096805; G08G 1/096811; G08G 1/096844; G08G 1/164; G08G 1/166; G08G 1/207; G09C 5/00; G09G 2354/00; G09G 2370/12; G09G 2370/16; G09G 2380/10; G09G 5/37; H04B 7/155; H04M 3/565; H04M 3/567; H04M 7/0027; H04N 2007/145; H04N 21/214; H04N 21/2181; H04N 21/2225; H04N 21/2265; H04N 21/2393; H04N 21/25816; H04N 21/25841; H04N 21/41422; H04N 21/43615; H04N 21/43637; H04N 21/454; H04N 21/4542; H04N 21/4751; H04N 21/6408; H04N 21/64322; H04N 7/147; H04N 7/155; H04N 7/181; H05K 999/99

See application file for complete search history.

(56) References Cited

U.S. PATENT DOCUMENTS

| | | | |
|---|---|---|---|
| 2014/0087752 | A1 | 3/2014 | Zhu et al. |
| 2015/0365787 | A1* | 12/2015 | Farrell .................... H04W 4/02 455/456.1 |
| 2016/0050526 | A1 | 2/2016 | Liu et al. |
| 2016/0308686 | A1* | 10/2016 | Vijayrao ............. H04L 12/2809 |
| 2017/0247000 | A1* | 8/2017 | Ricci .................. G06K 9/00302 |
| 2018/0136612 | A1* | 5/2018 | Zayets-Volshin ........................... H04M 1/72522 |
| 2018/0136950 | A1* | 5/2018 | Lefevre ................. H04H 60/33 |
| 2018/0146334 | A1* | 5/2018 | Wootton ............... H04W 4/029 |
| 2018/0164761 | A1* | 6/2018 | Kulkarni ............... G05B 15/02 |
| 2018/0299843 | A1* | 10/2018 | Ray ..................... H04L 41/0886 |
| 2018/0357547 | A1* | 12/2018 | Yamada ................. G06N 5/025 |
| 2019/0101306 | A1* | 4/2019 | Giorgi .................... F24F 11/74 |

OTHER PUBLICATIONS

Written Opinion of the International Searching Authority dated May 29, 2018 in connection with International Patent Application No. PCT/KR2018/002292.

\* cited by examiner

SYSTEM AND METHOD FOR AUTOMATED PERSONALIZATION OF AN ENVIRONMENT

TECHNICAL FIELD

This disclosure relates generally to automated control of devices. More specifically, this disclosure relates to a system and method for detecting a user and controlling an environment based on the detected user.

BACKGROUND

The Internet is evolving to the Internet of Things (IoT) where distributed entities, such as connected devices, exchange and process information without human intervention. Controlling IoT devices in an IoT environment is performed manually each time a user enters an environment. The absence of a centralized system to monitor and record a user's preferences for an IoT environment makes the task of adjusting the IoT environment cumbersome.

SUMMARY

In a first embodiment, an electronic device configured to control an environment includes a communication unit and a processor. The communication unit is configured to communicate with a server, at least one user device, and at least one connected device. The processor is operatively coupled to the communication unit and configured to receive identification information from the at least one user device, receive a user profile corresponding to the identification information of the at least one user device from the server, the user profile including at least one user preference, and control the at least one connected device to adjust the environment based on the user profile.

In a second embodiment, a method for controlling an environment using an electronic device includes receiving, at the electronic device, identification information from at least one user device. The method also includes receiving, at the electronic device, a user profile corresponding to the identification information of the at least one user device from a server, the user profile including at least one user preference. At least one connected device is controlled to control the environment based on the user profile.

In a third embodiment, a non-transitory computer readable medium embodying a computer program, the computer program comprising computer readable program code that when executed causes at least one processing device to receive, at an electronic device, identification information from at least one user device. The computer readable program code also causes the at least one processing device to receive, at the electronic device, a user profile corresponding to the identification information of the at least one user device from a server, the user profile including at least one user preference. At least one connected device is controlled to control an environment based on the user profile.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

Figure 1:
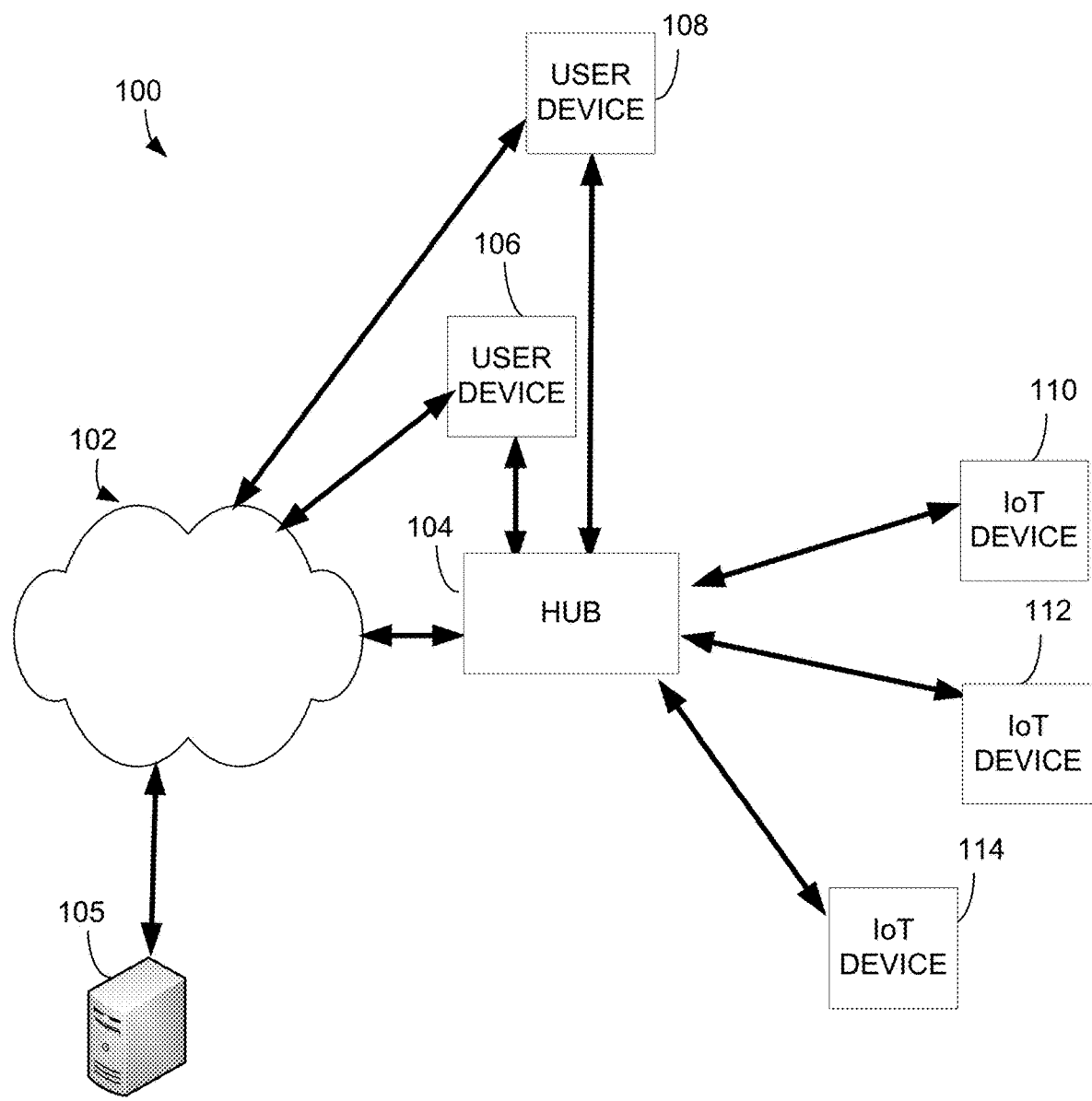
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between a hub 104 and/or user devices 106, 108 and a server 105. The hub 104 may communicate with a user device 106 or 108 using any near field communication techniques such as BLUETOOTH® or WI-FI®. The user devices 106, 108 may be, for example, a smartphone, a wearable device, or head-mounted display (HMD. Each user device includes any suitable computing or processing device that can provide computing services for one or more other devices. Each user device could, for example, include one or more processing devices, one or more memories storing instructions and data.

As be described below, the hub 104 adjusts the environmental settings by controlling IoT devices 110-114 based on the user device(s) detected by the hub 104. Each IoT device 110-114 represents any suitable computing or processing device that interacts with at least one user device, hub, or other computing device(s). In this example, the IoT devices 110-114 may include an electronic device, which, according to various embodiments of the present disclosure, may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, or a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the IoT devices 110-114 may be a home appliance. The home appliance may include at least one of, for example, a television, a Digital Video Disk (DVD) player, an audio, a refrigerator, an air conditioner, a vacuum cleaner, an oven, a microwave oven, a washing machine, a dryer, an air cleaner, a set-top box, a home automation control panel, a security control panel, a TV box (e.g., SAMSUNG HOMESYNC™, APPLE TV®, or GOOGLE TV®), a game console (e.g., XBOX® and PLAYSTATION®), an electronic dictionary, an electronic key, a camcorder, an electronic photo frame, etc.

According to another embodiment, the IoT devices 110-114 may include at least one a navigation device, a Global Positioning System (GPS) receiver, a Vehicle Infotainment Devices, a robot for home or industry, an automatic teller's machine (ATM) in banks, point of sale (POS) terminals in a shop, or home based devices (e.g., a light bulb, electric or gas meter, a sprinkler device, a fire alarm, a thermostat, a streetlamp, a toaster, fitness equipment, a hot water tank, a heater, a boiler, etc.). According to some embodiments, the IoT devices 110-114 may include at least one of a part of furniture or a building/structure, an electronic board, an electronic signature receiving device, or a projector. In various embodiments, the electronic device may be a combination of one or more of the aforementioned various devices. Further, the electronic device according to an embodiment of the present disclosure is not limited to the aforementioned devices.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system or environment.

Figure 2:
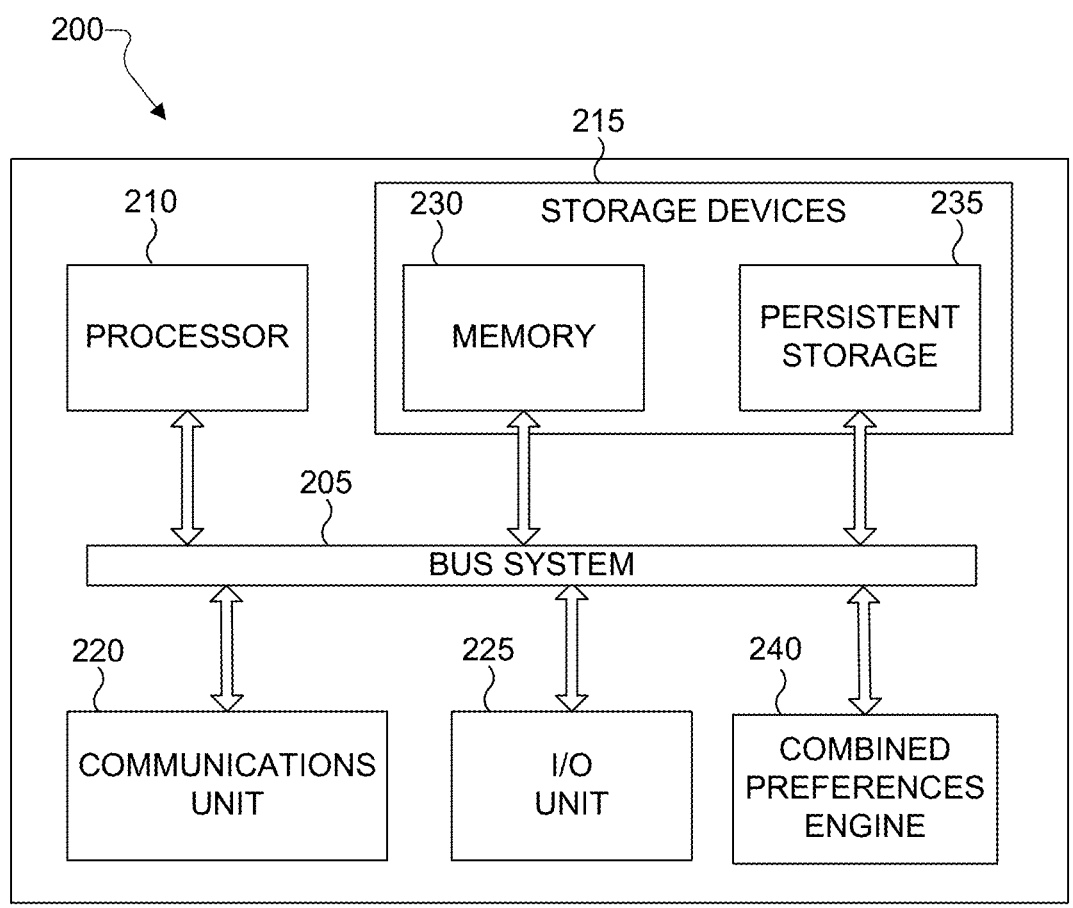
FIG. 2 illustrates an example device in a computing system according to this disclosure.
Figure 3:
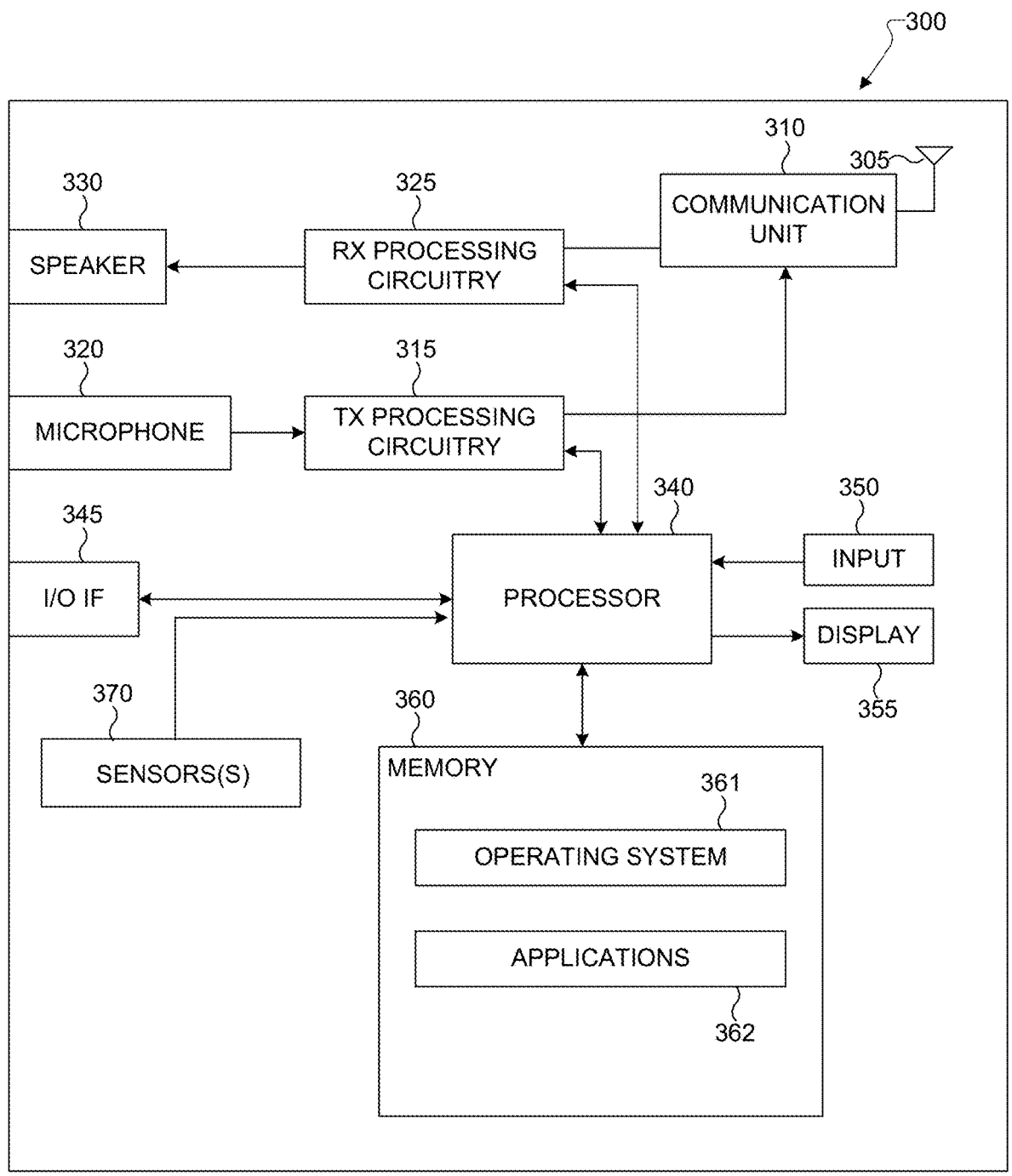
FIG. 3 illustrates an example electronic device according to this disclosure.

FIGS. 2 and 3 illustrate example devices in a computing system according to this disclosure. In particular, FIG. 2 illustrates an example electronic device 200, and FIG. 3 illustrates an example user device 300. The electronic device 200 could represent the hub 104 or the server 105 in FIG. 1, and the user device 300 could represent the user devices 106 and 108 or the IoT devices 110-114 in FIG. 1.

As shown in FIG. 2, the electronic device 200 includes a bus system 205, which supports communication between at least one processor 210, at least one storage device 215, and at least one communications unit 220.

The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc. Memory 230 stores an application thereon that is used to control one or more functions of the electronic device 200.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

In some embodiments, the electronic device 200 may include an I/O unit 225 that allows for input and output of data. For example, the I/O unit 225 may provide a connection for user input through a keyboard, mouse, keypad, touchscreen, or other suitable input device. The I/O unit 225 may also send output to a display, printer, or other suitable output device.

In some embodiments, the electronic device 200 may include a combined preferences engine 240. As described in more detail below, the combine preferences engine 240 may combine user profiles and/or preferences based on the number of users and/or position of the user in an environment. The combined preferences engine 240 may be incorporated in processor 210 or may be implemented by any suitable number(s) and type(s) of processors or other devices in any suitable arrangement.

As described in more detail below, the electronic device 200 may detect the presence of a user device 300. Based on the detection of the user device 300, the electronic device, such as hub 104, may apply user preferences to an environment.

Although FIG. 2 illustrates one example of an electronic device 200, various changes may be made to FIG. 2. For example, the electronic device 200 could include any number of each component shown in FIG. 2.

FIG. 3 illustrates an example user device 300 according to this disclosure. The embodiment of the user device 300 illustrated in FIG. 3 is for illustration only, and the user devices 106 and 108 of FIG. 1 could have the same or similar configuration. However, user devices come in a wide variety of configurations, and FIG. 3 does not limit the scope of this disclosure to any particular implementation of an electronic device. In one or more embodiments of this disclosure, the user device 300 may be replaced by a television or a HMD.

As shown in FIG. 3, the user device 300 includes a communication unit 310. The communication unit 310 may include, for example, a RF transceiver, a Bluetooth transceiver, or a WiFi transceiver. The mobile device 300 may also include transmit (TX) processing circuitry 315, a microphone 320, and receive (RX) processing circuitry 325. The user device 300 also includes a speaker 330, a processor 340, an input/output (I/O) interface (IF) 345, an input 350, a display 355, and a memory 360. The memory 360 includes an operating system (OS) program 361 and one or more applications 362.

The "communications unit 310" may receive an incoming RF signal such as, e.g., a BLUETOOTH® signal or a WI-FI® signal. The "communications unit 310" may down convert the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The communication unit 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the basic OS program 361 stored in the memory 360 in order to control the overall operation of the user device 300. For example, the processor 340 could control the reception of forward channel signals and the transmission of reverse channel signals by the communication unit 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the user device 300 with the ability to connect to other devices such as laptop computers and handheld computers. The I/O interface 345 is the communication path between these accessories and the processor 340.

The processor 340 is also coupled to the input 350 and the display 355. The operator of the user device 300 can use the input 350 (e.g., keypad, touchscreen, button etc.) to enter data into the user device 300. The display 355 may be a liquid crystal display, a light-emitting diode (LED) display, an optical LED (OLED), an active matrix OLED (AMO-LED), a transparent or opaque display such one or more lenses on a pair of augmented reality glasses where one or more images maybe projected onto or displayed using the lens, or other display capable of rendering text and/or at least limited graphics, such as from web sites. In one embodiment, the input 350 is a touchscreen. The touchscreen could include a touch panel, a (digital) pen sensor, a key, or an ultrasonic input device. The touchscreen could recognize, for example, a touch input in at least one scheme among a capacitive scheme, a pressure sensitive scheme, an infrared scheme, or an ultrasonic scheme. The touchscreen could also include a control circuit. In the capacitive scheme, the touchscreen could recognize touch or proximity.

The memory 360 is coupled to the processor 340. Part of the memory 360 could include a random access memory (RAM), and another part of the memory 360 could include a Flash memory or other read-only memory (ROM).

User device 300 may further include one or more sensors 370 that can meter a physical quantity or detect an activation state of the user device 300 and convert metered or detected information into an electrical signal. For example, sensor 370 may include one or more buttons for touch input, e.g., on the headset or the user device 300, one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 370 can further include a control circuit for controlling at least one of the sensors included therein. As will be discussed in greater detail below, one or more of these sensor(s) 370 may be used to control a UI, detect UI inputs, determine the orientation and facing direction of the user for 3D content display identification, etc. Any of these sensor(s) 370 may be located within the user device 300, within a headset configured to hold the user device 300, or in both the headset and user device 300, for example, in embodiments where the user device 300 includes a headset.

Although FIG. 3 illustrates one example of user device 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs).

Figure 4:
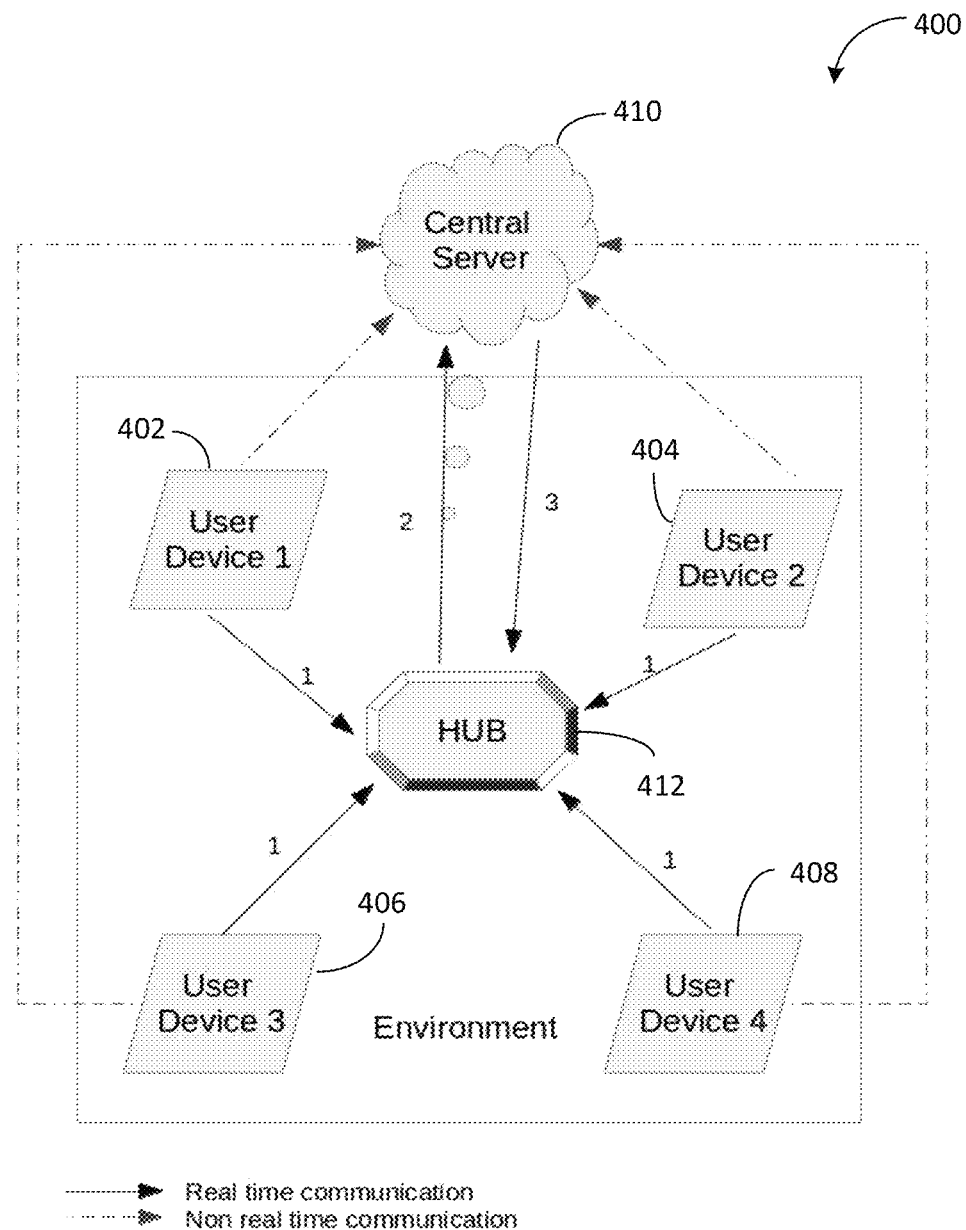
FIG. 4 illustrates an example automated centralized system according to this disclosure.

FIG. 4 illustrates an example automated centralized system 400 to store and use individual preferences and apply the individual preferences to different environments which have programmable settings. This process of automating the environment according to user's pre-defined personal preferences may be useful in any programmable environment. The system 400 may include a number of user devices 402-408, a central server 410, and a hub 412. The user devices 402-408 may have a structure similar to user device 300 of FIG. 3 and central server 410 and hub 412 may have a structure similar to electronic device 200 of FIG. 2.

The user may create a user profile including his or her preferences using a user device, e.g., user device 402. The user profile may be created by an application stored and executed by user device 402 by selecting options provided by the application. Once created, the user profile is stored on central server 410. The user profiles may be categorized based on a selection by the user when the profile is created or automatically by the central server or hub based on the context of the content. Profiles may be included in a singular category or in multiple categories. As an example, the user profiles where a user's preference information is only disclosed the user's home, vehicle, or other personal environment may be categorized as private. The private user profile may require permission or authorization from the user to be made available to external environments. As another example categorization, the user profile where the preference information is available to any environment may be categorized as public. Another example categorization may be categorizing the user profile where the preference information is applied when the user is alone in an environment within the individual category. An example categorization of the user profile in the group category may occur where the preference information is applied when the user is in an environment with at least one or more other users detected.

When one or more users enter an environment (e.g., car, home, office, store, restaurant, meeting room, etc.) the corresponding user devices 402-408 communicate with the hub 412 and provide identification information of the user. Based on the identification information of the user, the hub 412 obtains a user profile corresponding to the user. The user profile may be stored on the hub 412 such as in memory 230, the user profile may be retrieved from central server 410, or the user profile may be retrieved from the user device 402. Once the user profile is obtained, the hub 412 adjusts the environmental settings of the environment based on the user profile by controlling one or more IoT devices such as IoT devices 110-114.

In some embodiments, more than one user may enter an environment. If more than one user is detected in an environment, a combined preferences engine 240 may combine the user profiles for each user by applying preset algorithms. For example, in setting the temperature of the environment, the combined preferences engine 240 may calculate the average temperature preference from all the user profiles and adjust it based on a preset limit according to additional factors, such as the weather, time of day, and/or time of year, etc. In another example, in order to achieve optimal lighting conditions, the combined preferences engine 240 may determine the values preferred by a majority of the detected. In a situation where there is no majority, the lighting conditions may be adjusted to a predetermined value or to a value between the preferences of the users. As with the previous example, external factors may also be taken into account, such as the time of day, available natural lighting (e.g., blinds open/closed, sunlight provided, direction of the ambient lighting, etc.), activity occurring (e.g., watching a movie, etc.), etc. In yet another example, music preferences may be determined by a majority of the users detected in the environment.

In yet another example, where the environment is a restaurant, each user may prefer a specific table in the restaurant. The combined preferences engine 240 may take into account a number of factors such as table locations, available tables, table reservations, closed sections, available service staff. Using the various factors and the user's preferred seating included in the user profile, the combined preference engine 240 may assign a table to the user. In some instances, the combined preferences engine may award the same table to two or more different users. In such instances, the combined preference engine 240 may award the table to the first user to enter the environment or to the party that has the most members in the environment at a specific time.

Figure 5:
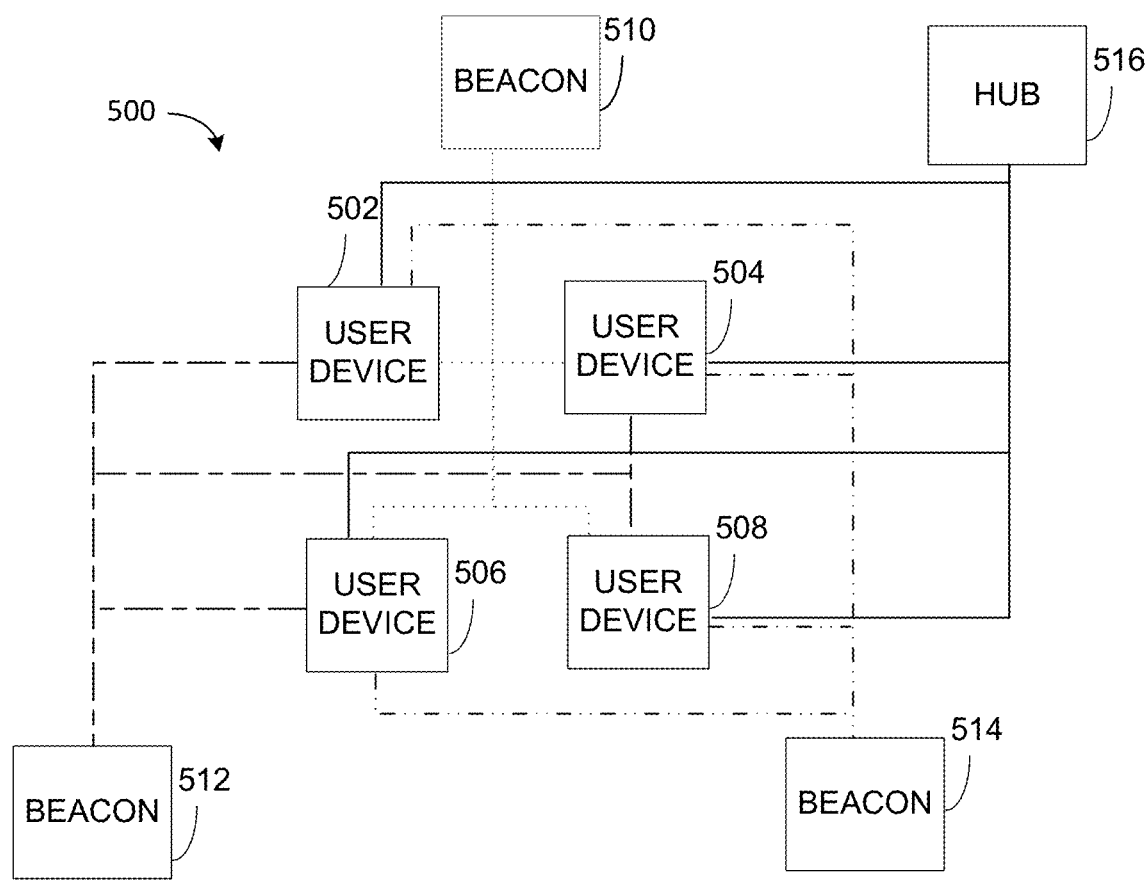
FIG. 5 illustrates an example system for determining a position of one or more users according to this disclosure.

FIG. 5 illustrates an example system 500 for determining a position of one or more users in an environment based on location information provided by one or more user devices. As shown in FIG. 5, user devices 502-508 communicate with a number of beacons 510-514. User devices 502-508 may have a structure similar to user device 300 of FIG. 3 and beacons 510-514 may be BLUETOOTH® LE (BLE) beacons. The beacons 510-514 transmit an advertising signal to the user devices 502-508 and, based on the power of the advertising signals, each user device 502-508 determines the distance between the user device and each beacon and transmits the distances to the hub 516 as location information. In one example, based on the distances, the hub 516 determines the position of each user device in the environment using trilateration, i.e., using the distances between the user device and at least three of the beacons. In order to avoid possible sources of interference, in some embodiments, the advertising signals have a high frequency. In other embodiments, the beacons 510-514 are placed in a high location to avoid interference. For example, in an automobile, the beacons 510-514 may be placed near the roof of the automobile.

In some embodiments, the beacons 510-514 may be removed and the location information may include global positioning coordinates from the respective user devices 502-508. In other embodiments each location in the environment may include a sensor, such as a near field communication (NFC) sensor, a machine readable code (e.g., QR code) scanner, an image capture device (such as a camera) disposed in the user device or in the environment for a person to activate and indicate his or her relative position in the environment.

Figure 6:
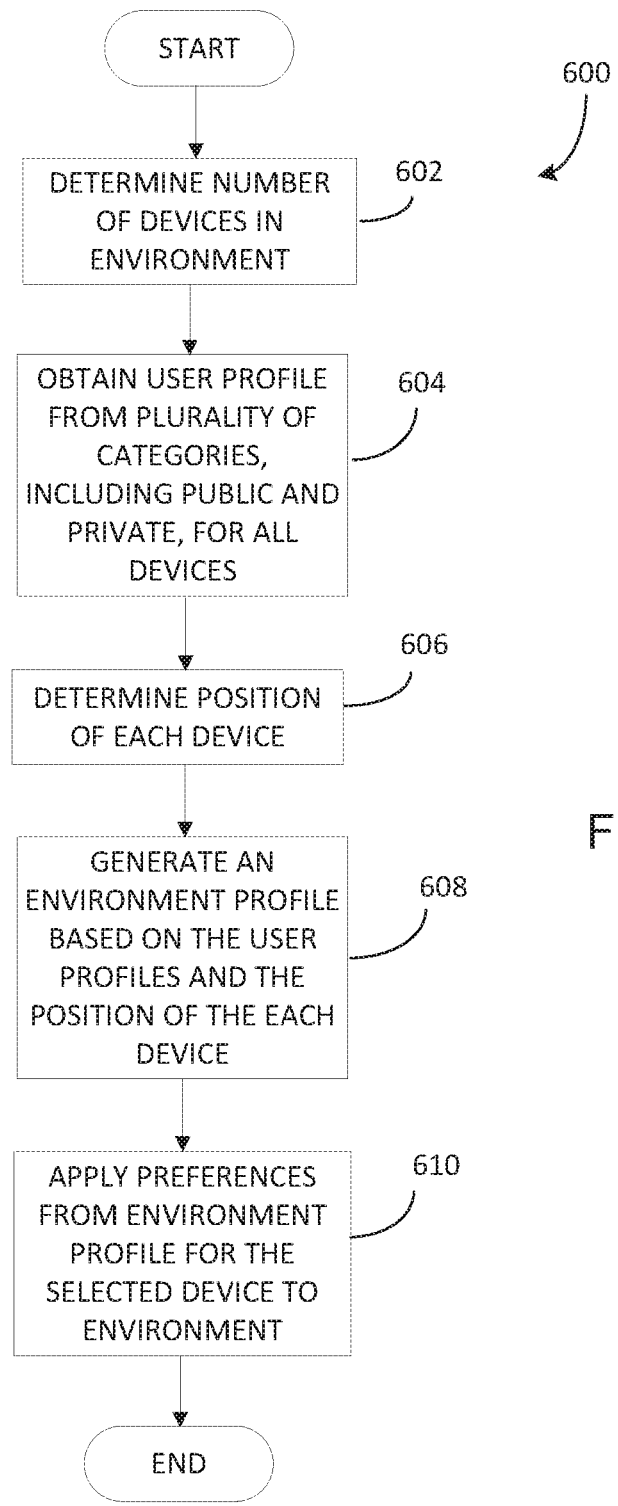
FIG. 6 illustrates a flowchart of a method for controlling an environment according to this disclosure.

FIG. 6 illustrates a flowchart of a method 600 for controlling an environment according to this disclosure. For ease of description, the method 600 of FIG. 6 will be described while making reference to an automobile environment and the automated centralized system 400 of FIG. 4.

In operation 602, the number of user devices 402-408 in an environment is determined by the hub 412. In some embodiments, the number of devices may determine the algorithm used by the hub 412 to determine the preferences applied to the automobile environment such as temperature or music preferences. For example, with regard to temperature preferences, when an automobile has one temperature zone, the hub 412 would average all the temperature preferences from the corresponding user profiles. The average temperature preference would fall between a minimum and maximum temperature based on time and date. With regard to music preferences, the music selection may be based on the most popular genre or a mix of all the genres. In some instances, based on the number of people that prefer no music, the volume of the music may be adjusted or speakers may be activated or deactivated based on where the user that prefers no music is seated.

In operation 604, the user profiles corresponding to each of the user devices 402-408 in the automobile environment are retrieved by the hub 412. The user profiles may be stored on the user devices 402-408 or obtained from a central server 410. In some embodiments, the hub 412 may have previously retrieved the user profiles from the central server 410 and stored the user profile in a memory.

In operation 606, the position of each user device is determined by the hub 412. As described above, the position of the user device may be determined using at least three beacons 510-514. The distances between the user device and at least three beacons may be supplemented by additional information provided by global positioning coordinates and/or other sensors, such as, an NFC sensor, a QR code scanner, or an image capture device. The position of each user device may be used to determine which preferences are applied to the automobile environment as described below.

In operation 608, an environment profile is generated based on the retrieved user profiles and the position of each user device. For example, the environment profile would include preferences for the driver seat, steering wheel, mirrors, indicators, and/or alarms from the user profile corresponding to the user in the driver seat. The environment profile may also include preferences for window settings and/or seat settings (such as posture, heated seats, or cooling seats) for each seat in the automobile environment based on the user occupying the particular seat. In some automobiles, each seat may have its own temperature zone. In such instances, the environment profile would include the temperature setting for each temperature zone from the user profile corresponding to the user occupying the particular seat. In automobiles with only one temperature zone, the temperature preferences from all the user profiles may be averaged and applied to the automobile environment. The environment profile may also include music preferences. The music preferences may be based on the most popular genre, a mix of all the genres included in the user profiles, or the genre preferred by a majority of the users as indicated by the user profiles. In some instances, some users may prefer to hear music while other users do not. The environment profile may include preference information regarding a sound level of the music or the environment profile may include information regarding which speakers to activate corresponding to the users who prefer to hear music. The environment profile is applied to the environment in operation 610.

In some embodiments, the user may adjust the environment after the preferences are applied. This may be achieved by an artificial intelligence (AI) application executed by the hub 412. The user may activate an AI application to learn the user's preferences. The AI application may cycle through IoT device by adjusting each preference to a predetermined preference. The AI application may query one or more users whether the adjusted preferences are acceptable. The user may speak in response to the query and the hub 412 and hub 412 would convert the speech into text which would be translated into an intelligent command. Based on the user's response, the AI application may adjust the environment as well as the environment profile and/or the user profile.

Although FIG. 6 is described with regard to an automobile environment, the operations of FIG. 6 may be applied to other environments such as a home, office, meeting room, restaurant, bar, airplane, hotel room, etc. In such environments, the environment profile may include, but is not limited to, a temperature setting, a window shade setting (e.g., open, closed, partially open), a television setting (e.g., brightness, contrast, favorite channels, home channel, parental controls, restricted channels), and/or a light setting.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device configured to control an environment, the electronic device comprising:
   a communication circuit configured to communicate with a server, at least one user device, and at least one connected device; and
   a processor operatively coupled to the communication circuit, the processor is configured to:
      receive identification information from the at least one user device,
      retrieve, a user profile corresponding to the identification information of the at least one user device from the server, the user profile including at least one user preference, the user profile being included in at least one of a plurality of categories,
         wherein the plurality of categories comprises at least one of a private category or a public category, and
      control the at least one connected device to adjust the environment based on the user profile and the categorization of the user profile.

2. The electronic device of claim 1, wherein the at least one user device includes a plurality of user devices and the processor is configured to:
   receive a plurality of identification information corresponding to the plurality of user devices; and retrieve a plurality of user profiles corresponding to the plurality of user devices.

3. The electronic device of claim 2, further comprising a combined preferences engine configured to combine user preferences from the plurality of user profiles, wherein the processor is configured to control the at least one connected device based on the combined user preferences, wherein the combined user preferences includes an average value or a majority value based on a plurality of user preferences.

4. The electronic device of claim 2, wherein the processor is further configured to:
determine a position of each user device among the plurality of user devices based on location information from the plurality of user devices.

5. The electronic device of claim 4, wherein the location information includes a distance between the user device and at least three beacons in the environment.

6. The electronic device of claim 4, wherein the location information includes global positioning coordinates of each user device.

7. The electronic device of claim 4, wherein the processor controls the at least one connected device based on the position of each user device and the corresponding user profile.

8. The electronic device of claim 1, wherein the environment is an automobile and the at least one user preferences includes at least one of a temperature setting, a steering wheel setting, a radio setting, or a seat setting.

9. The electronic device of claim 1, wherein the environment is a room and the at least one user preferences includes at least one of a temperature setting, a window shade setting, a television setting, or a light setting.

10. A method for controlling an environment using an electronic device, the method comprising:
receiving, at the electronic device, identification information from at least one user device;
retrieving, at the electronic device, a user profile corresponding to the identification information of the at least one user device from a server, the user profile including at least one user preference, the user profile being included in at least one of a plurality of categories,
wherein the plurality of categories comprises at least one of a private category or a public category; and
controlling at least one connected device to adjust the environment based on the user profile and the categorization of the user profile.

11. The method of claim 10, wherein the at least one user device includes a plurality of user devices and the method comprises:
receiving a plurality of identification information corresponding to the plurality of user devices; and
receiving a plurality of user profiles corresponding to the plurality of user devices.

12. The method of claim 11 further comprising:
combining user preferences from the plurality of user profiles; and
controlling the at least one connected device based on the combined user preferences, wherein the combined user preferences includes an average value or a majority value based on a plurality of user preferences.

13. The method of claim 11 further comprising determining a position of each user device among the plurality of user devices based on location information from the plurality of user devices.

14. The method of claim 13, wherein the location information includes a distance between the user device and at least three beacons in the environment.

15. The method of claim 13, wherein the location information includes global positioning coordinates of each user device.

16. The method of claim 13, further comprising controlling the at least one connected device based on the position of each user device and the corresponding user profile.

17. A non-transitory computer readable medium including a plurality of instructions that, when executed by a processor, are configured to cause the processor to:
receive, at an electronic device, identification information from at least one user device;
retrieve, at the electronic device, a user profile corresponding to the identification information of the at least one user device from a server, the user profile including at least one user preference, the user profile being included in at least one of a plurality of categories,
wherein the plurality of categories comprises at least one of a private category or a public category; and
control at least one connected device to adjust an environment based on the user profile and the categorization of the user profile.

18. The non-transitory computer readable medium of claim 17, wherein the at least one user device includes a plurality of user devices and the plurality of instructions is further configured to cause the processor to:
receive a plurality of identification information corresponding to the plurality of user devices; and
receive a plurality of user profiles corresponding to the plurality of user devices.

19. The non-transitory computer readable medium of claim 18, wherein the plurality of instructions is further configured to cause the processor to:
combine user preferences from the plurality of user profiles; and
control the at least one connected device based on the combined user preferences, wherein the combined user preferences includes an average value or a majority value based on a plurality of user preferences.

20. The non-transitory computer readable medium of claim 18, wherein the plurality of instructions is further configured to cause the processor to determine a position for each user device among the plurality of user devices based on location information from the plurality of user devices.

* * * * *